Aug. 1, 1944.  A. A. PROPERNICK  2,354,927
COVER STRUCTURE
Filed Oct. 10, 1942     2 Sheets-Sheet 2

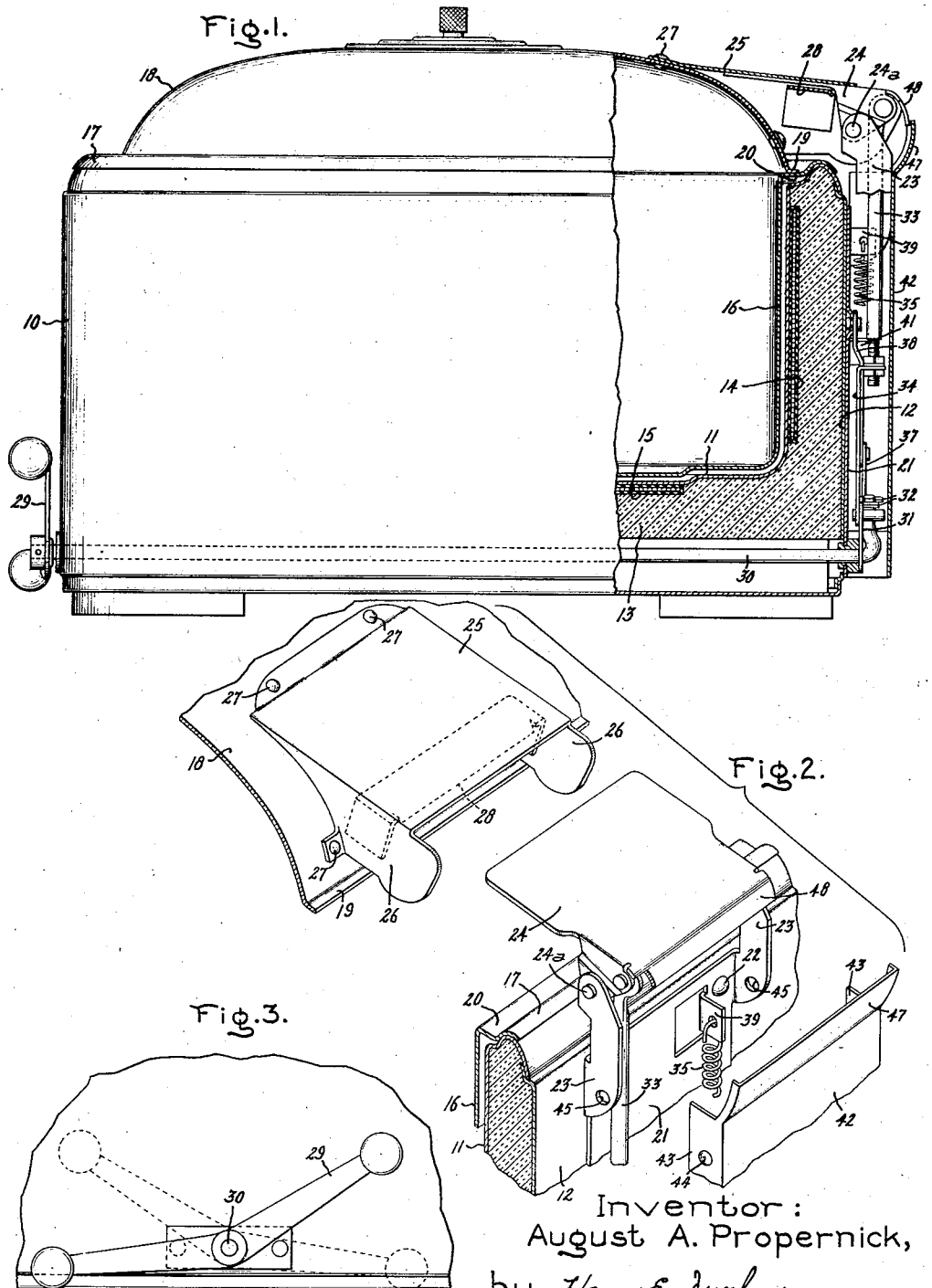

Inventor:
August A. Propernick,
by Harry E. Dunham
His Attorney.

Patented Aug. 1, 1944

2,354,927

UNITED STATES PATENT OFFICE 2,354,927

COVER STRUCTURE

August A. Propernick, Rochester, N. Y., assignor to General Electric Company, a corporation of New York Application October 10, 1942, Serial No. 461,587

4 Claims. (Cl. 268—1)

This invention relates to a cover structure, more particularly to a cover structure for use in connection with a cooking utensil, such as a roaster, and it has for its object the provision of an improved cover structure for a device of this character wherein the cover may be opened and closed without grasping any part of the cover itself.

This invention, while not limited thereto, is particularly useful in connection with cooking utensil covers which become hot in the cooking operation, since the cover may be opened and closed without grasping it; and it is especially applicable to utensils that are open at the top, and have a cover for closing the opening which is swung on an axis from its closed to an upright open position.

In accordance with this invention, the cover in one form thereof, is mounted upon a hinge which has an element constructed and arranged to elevate the cover to open it, and to permit the cover to lower to its closed position.

This hinge element is connected to a pivoted arm which when turned in one direction operates the element to raise the cover, and when turned in the reverse direction permits the cover to fall to its closed position.

A toggle is connected to the arm and a spring is connected to the toggle all in such manner that when the cover is lifted to open the utensil, the toggle moves from a position on one side of its dead-center position to the other side to thereby permit the spring to assist in lifting the cover, and also to retard its movement when it is lowered so that the spring counter-balances the weight of the cover substantially throughout its full movement between its open and closed positions. When the cover is moved to completely close the utensil, the toggle moves through the dead-center position to return to its initial position and in doing so disables the spring so that it cannot exert any lifting force on the cover while the cover is in its closed position.

Figure 4:
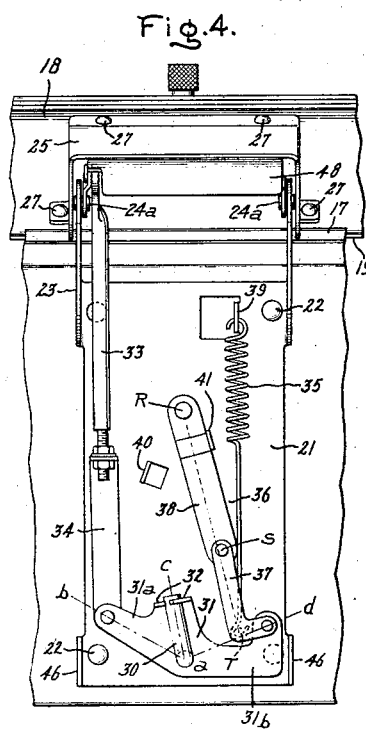
Figure 5:
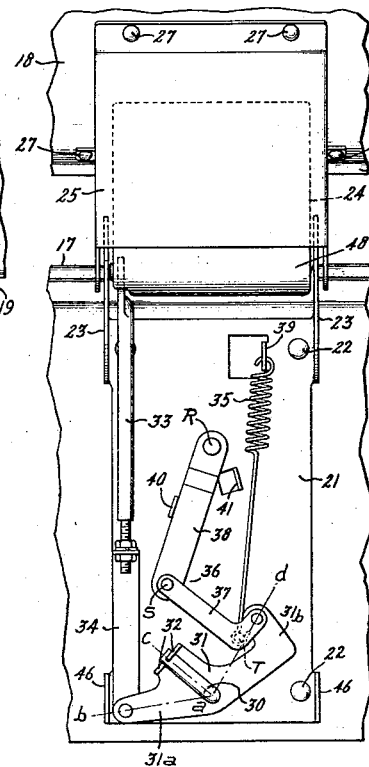
Figure 6:
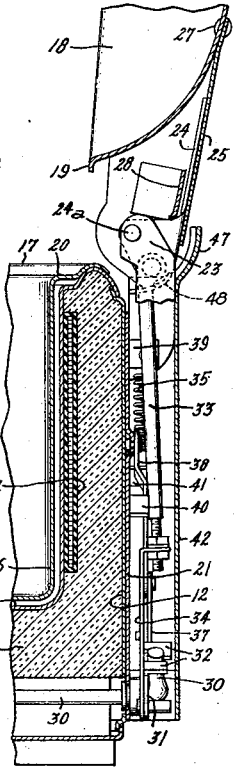

For a more complete understanding of this invention, reference should be had to the accompanying drawings in which Fig. 1 is an end elevation, partly in section of an electric roaster provided with a cover structure embodying this invention; Fig. 2 is an expanded perspective view of certain elements of the cover structure embodied in Fig. 1; Fig. 3 is a fragmentary front elevation of a portion of the roaster shown in Fig. 1; Fig. 4 is a rear elevation of a part of the cover structure embodied in the roaster of Fig. 1; Fig. 5 is a view similar to Fig. 4, but illustrating certain parts of the structure in different operative positions than in Fig. 4; and Fig. 6 is a fragmentary sectional view showing parts of the roaster of Fig. 1 that are in section, but in different operative positions.

Referring to the drawings, this invention has been shown in one form as applied to an electrically heated roaster having a well or receptacle defining portion 10. This portion 10 has an inner lining 11 and an outer lining 12 spaced therefrom, and in the space between the two linings is a suitable heat insulating material 13, such as rock wool. The linings 11 and 12 may have any suitable shape, but in the roaster illustrated they are shaped to define a substantially rectangular receptacle.

Surrounding the side walls of the inner lining 11 is an electrical heating element 14, and placed below the bottom wall of this lining is a second heating element 15.

Inserted within the inner lining 11 is a removable well 16 provided with a marginal outwardly extending flange 17 at its upper end which serves to support the well within the inner lining 11.

The open top of the well 16 is closed by a dome-shaped cover 18 which at its bottom has an outwardly extending flange 19 that rests upon a seat 20 provided for it in the flange 17 of the removable receptacle 16 when the cover is closed.

At the rear, the cover 18 is hinged to swing upwardly from its closed position to an upper open position. The hinge preferably will be located at the center between the two end edges of the roaster. It comprises a hinge bracket 21 which, as shown, is in the form of a relatively wide elongated plate positioned back of the rear wall 12 and to which it is secured in any suitable manner, as by rivets 22. At the upper ends of the sides of the plate 21 are outwardly projecting hinge arms 23 on which the cover is pivotally mounted. A hinge 24 in the form of a flat relatively large plate is hinged to the brackets 23, the plate, as shown, being provided with hinge pins 24a that are journaled in the brackets 23.

The cover 18 is mounted upon the hinge 24 so that it may be operated between its open and closed positions by means of the hinge, and also may be radially removed therefrom and applied to it. For the purpose of thus mounting the cover upon the hinge 24 there is attached to the rear of the cover a hinge cover and support assembly comprising a member 25 of plate-like form having downwardly extending tabs 26 at its sides, the plate and tabs being secured to the cover by any suitable means, such as rivet 27. Secured to the tabs is a hinge support member 28. This member, as shown more clearly in Figs. 1 and 6, is spaced below the surface of the plate 25 so that the hinge 24 may be inserted between these members in order to secure the cover to the hinge. When the hinge is swung upwardly, the plate 28 will act as a fulcrum, so to speak, and bind the hinge plate 24 so that it will carry the cover upwardly with it; when the hinge is swung downwardly the cover will lower to its closed position.

The foregoing hinge means is described and claimed in my divisional application, Serial No. 510,046, filed November 12, 1943, and which is assigned to the same assignee as the present application.

The movement of the hinge 24 to control the opening and closing movements of the cover comprises suitable mechanism which is controlled by means of a control arm 29 located at the front of the roaster. This arm 29 is mounted on the forward end of a suitable operating rod 30 which is located at the bottom of the well 10 and which extends from the front to the rear thereof, as shown. Mounted on the rear end of the rod 30 is a bell crank 31 which is secured to rotate with the rod; as shown, the extreme inner end of the rod is bent or turned at right angles to the body of the rod, and this turned end is secured to the bell crank by means of ears 32 formed on the bell crank and embracing it, as shown.

As shown, the bell crank 31 is provided with a left-hand arm 31a, as viewed in Figs. 4 and 5, and a right-hand arm 31b angularly positioned with relation to each other. The left-hand arm 31a is directly connected to the hinge 24. The connection means between this arm and the hinge comprises a connecting rod 33 which has its upper end pivotally connected to the hinge 24 at a point to the rear of the axis of movement of the hinge on its pins 24a, as more clearly shown in Figs. 1, 2 and 6; it also comprises a link 34 which has its upper end adjustably secured to the lower end of the connecting rod 33 and its lower end pivotally connected to the extremity of the lever arm 31a. It will be observed in view of these connections that if the rod 30 be rotated counter-clockwise, as viewed in Figs. 4 and 5, the arm 31a will be lowered so as to elevate the hinge 34 and thereby the cover 18 attached to it, whereas when the rod 30 is moved in the reverse direction the connecting rod will be raised to permit the cover to move to its closed position.

The weight of the cover is counter-balanced so that very little effort is required to move it between its open and closed positions. For this purpose, a counter-balance spring 35 is provided which is connected to the extremity of the right-hand bell crank arm 31b through a toggle 36. As shown, the extremity of the right-hand arm 31b is turned upwardly at right angles to the body of the arm so that the arm in effect has an L-shape with the short leg of the L positioned generally vertically. The toggle 36 is provided with a similarly-shaped link 37 having the extremity of the short arm thereof pivotally secured to the upper end of the short leg of the arm 31b. The end of the other arm of the link 37 is connected to the second link 38 of the toggle at point S; the second link 38 has its other end pivotally mounted upon the hinge bracket plate 21 at point R. The counter-balance spring 35 has its upper end anchored to a tab 39 lanced from the plate, and has its lower end attached to the link 37 at point T substantially at the apex of its two arms, as clearly shown in Figs. 4 and 5. The movement of the toggle is limited in opposite directions by means of a pair of stops 40 and 41.

It will be observed that the spring 35 is located on the right side of the toggle beyond the position of the stop 41, and that it is angularly positioned with relation to the toggle when in its position shown in Fig. 4. Moreover, the bell crank 31 and the toggle 36 are so shaped and related to each other, and the stops 40 and 41 are so positioned that when the cover 18 is closed, as shown in Figs. 1 and 4, the link 38 of the toggle is forced against the stop 41 by means of the spring 35, and in this position of the toggle the two links 37 and 38 are positioned slightly to the right-hand side of the dead-center of the links as determined by the location of pivot points R and T. In other words, when the cover is closed, the parts are so arranged that the spring 35 is disabled in the sense that it cannot exert any lifting action on the cover.

However, if the operating arms 29 operate the rod 30 in a counter-clockwise direction, as viewed in Figs. 4 and 5, the toggle point S almost instantly will be moved to the left beyond its dead-center position indicated by the dotted line RT, whereby the spring 35 is rendered effective to pull upwardly on the arm 31b of the bell crank 31 and thereby assist in the opening of the cover. Likewise, in the closing of the cover, it will balance its weight until the cover has substantially reached its closed position when the toggle will be returned through its dead-center position to its initial position against the stop 41 wherein it again disables the spring 35. The stop 40, it will be understood, functions to limit the movement of the toggle 36 by the spring 35 when the cover is opened, and that the spring in holding the toggle against the stop 40 will hold the cover open.

In the specific example illustrated, the bell crank arms 31a and 31b are arranged at a relatively wide angle so that the angle between a line ab between the apex of the bell crank and the pivotal connection between the lower end of the link 34 and the arm 31a, and the axial line ac of the bent extension of the rod 30 is approximately 49°; and the angle between this line ac, and a line ad from the apex to the pivotal connection between the toggle link 37 and the arm 31b is 77°. This angular relationship is in no way limiting but it does give a smooth nice movement of the cover controlling mechanism. Also, the spring at all times will exert approximately the desired force to just balance the cover, with the result that only light forces are required on the operating lever 29 to cause the cover to open or close. When the cover is in its vertical open position substantially no force is required to balance it, and when it is in a horizontal position the maximum force is required; in between these positions, the force at any point required depends upon the distance of the position from the horizontal where the maximum is required. It will be observed that when the cover is in its vertical position, the spring 35 will be close to its full length, and thus it will exert only a light force, that is, one only sufficiently great to hold the cover in the open position. When the cover has substantially reached its closed position, the effective spring force will be at its maximum, but when the cover completes its closing, the effective spring force quickly goes from its maximum limiting value to a zero value—the maximum value to keep the cover from striking as it closes, and the zero value to allow the full weight of the cover to act to keep it sealed after closing.

The hinge bracket plate 21 is provided with a cover 42 which has internally extending flanges 43 at its sides. Provided in the upper and lower ends of these flanges 43 are pressed-in sections 44 which are received in apertures 45 provided for them in the hinge arms 23 at the top and in flanges 46 at the bottom of the plate 21 so as to hold the cover on the roaster. At the upper end of the plate 42 is an upwardly curved extension 47, and at the rear of the hinge plate 24 there is a downwardly extending curved section 48, the two curved sections overlapping, as shown in Figs. 1 and 6 so as to close the hinge structure at the top in all positions of the cover. The hinge at the top is closed at the sides by means of the downwardly-extending sections 26 provided on the hinge cover and support member 25.

In the operation of the device, it will be understood that when it is desired to open the cover, the arms 29 will be moved clockwise, as viewed in Fig. 3, which operation will move the bell crank 31 counter-clockwise, as viewed in Figs. 4 and 5. This operation will lower the connecting rod 33 so as to elevate the cover, and will release the spring 35 so that it can function to balance the weight of the cover, and to hold it in its open position, all in the manner previously described. If it be desired to close the cover, the arms 29 will be operated in the reverse direction, which operation will elevate the connecting rod 33 and permit the cover to fall to its closed position, the spring at this time also functioning to balance the weight of the cover. When the cover has substantially reached its closed position, the toggle 36 will be moved against the stop 41 to disable the spring.

If it be desired to remove the cover from the hinge it is merely necessary to elevate the cover slightly and draw it forwardly so as to withdraw the members 25 and 28 from the plate-like extension 24 of the hinge. The cover, of course, may be replaced merely by reinserting the hinge between the members 25 and 28.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. Operating and counter-balance mechanism for a member movable from a substantially horizontal position to a substantially vertical position comprising, a bell crank mounted for movement on a fixed axis, means for moving said bell crank on said axis, means connecting one arm of said bell crank to said member so that when it is moved in one direction it moves said member from said horizontal to said vertical position and when moved in the opposite direction it returns said member to said horizontal position, a toggle connected to the other end of said bell crank, said toggle located on the first side of the dead-center position of said toggle when said member is in its horizontal position, a stop on said first side for limiting the movement of said toggle, a spring connected to an element of said toggle so as to apply a force directed angularly thereto from said first side so that it holds said toggle in a broken position against said stop, said stop absorbing said force of said spring so that the spring cannot tend to lift said member from said horizontal position, a second stop located on the other side of said dead-center position, and said toggle being moved by said bell crank from said first stop to and through said dead-center position toward said second stop when said bell crank operates said member from said horizontal to said vertical position, the spring force then pulling said toggle toward said second stop to assist in moving said member to said vertical position.

2. Operating and counter-balance mechanism for a member movable from a substantially horizontal to a substantially vertical position comprising, an operating arm mounted for rotation on a substantially fixed axis, connection means between said arm and said member for moving said member from its horizontal position to its vertical position by movement of said arm from a first to a second position and permitting the member to return to its horizontal position by return movement of said arm to said first position, a toggle having a pair of pivotally interconnected links one connected to a fixed pivot and the other to said operating arm, first and second stops on opposite sides of the dead-center position of said toggle for limiting its movement in opposite directions, a spring on the side of said toggle where said first stop is located applying its force to the other of said links at such an angle that it holds said toggle against said first stop when said member is in its horizontal position and biases said toggle toward said second stop when said toggle has been moved in one direction toward said second stop beyond said dead-center position as the member is being operated to its vertical position so as to counterbalance the weight of said member while moved to its vertical position, the toggle being moved in the other direction toward said first stop as said member is being returned to said horizontal position, and said spring again holding said toggle against said first stop when said member is in said horizontal position.

3. Operating and counter-balance mechanism for a member movable from a substantially horizontal position to a substantially vertical position comprising, an operating crank arm mounted for rotation on a substantially fixed axis, connection means between said crank arm and said member for moving said member from its horizontal position to its vertical position by movement of said arm from a first to a second position and permitting the member to return to its horizontal position by return movement of said arm to said first position, a toggle connected to said arm provided with a first link and a link of L-shape, means pivotally connecting the end of one arm of said L-shaped link with one end of said first link, a fixed pivot for the other end of said first link, a pivotal connection between the end of the other arm of said L-shaped link and the end of said crank arm, spaced stops for said toggle on opposite sides of said first link limiting the movement of said toggle to two broken positions on opposite sides of the dead-center position of said toggle, the first of said stops being positioned a sufficient distance from said first link to provide for substantially the entire movement of said member from its horizontal to its vertical position when said toggle is moved from said dead-center position to said first stop, and the second stop being positioned relatively close to said first link so that said toggle moves just beyond said dead-center position when said member is moved to said horizontal position, and a tension spring on the same side of said dead-center position as said second stop having one end connected to said L-shaped link substantially at its apex, means anchoring the other end of said spring so as to position the spring to apply its force in such a direction that it holds said toggle against said second stop when said member is in said horizontal position, and when said toggle moves beyond said dead-center position toward said first stop to bias the toggle toward said first stop and said crank arm in such a direction as to assist in the lifting of said member to said vertical position.

4. Operating and counter-balance mechanism for a member movable from a substantially horizontal position to a substantially vertical position comprising, a bell crank mounted for rotation on a fixed axis located at its fulcrum, the two arms of said bell crank being arranged at a relatively wide angle to each other and one of its arms having the shape of an L, connection means between the end of the other arm and said member for moving the member from its horizontal position to its vertical position by rotation of said bell crank from a first to a second position and permitting the member to return to its horizontal position by return movement of said bell crank to its first position, a toggle connected to said bell crank provided with a first link and a link of L-shape, means pivotally connecting the end of one arm of said L-shaped link with one end of said first link, a fixed pivot for the other end of said first link, a pivotal connection between the end of the other arm of said L-shaped link and the end of the short arm of the L-shaped arm of said bell crank, spaced stops for said toggle on opposite sides of said first link limiting the movement of said toggle to two broken positions on opposite sides of the dead-center position of said toggle, the first of said stops being spaced a sufficient distance from said link to provide for substantially the full movement of said member from its horizontal position to its vertical position when said toggle is moving from said dead-center position to said first stop, and the second stop being positioned relatively close to said first link so that the toggle moves just beyond said dead-center position when said member is moved to its horizontal position, and a tension spring located on the same side of said toggle as said second stop and beyond said second stop and having one end connected to said L-shaped link substantially at its apex, and means anchoring the other end of said spring so that the force of said spring is applied to said toggle link in such a direction as to bias said toggle toward said first or second stop depending upon the position of said toggle with reference to said dead-center position.

AUGUST A. PROPERNICK.

CERTIFICATE OF CORRECTION.

Patent No. 2,354,927. August 1, 1944.

AUGUST A. PROPERNICK.

It is hereby certified that error appears in the printed specification of the above numbered patent requiring correction as follows: Page 3, first column, line 1, for the word "limiting" read --lifting--; and that the said Letters Patent should be read with this correction therein that the same may conform to the record of the case in the Patent Office.

Signed and sealed this 26th day of September, A. D. 1944.

Leslie Frazer (Seal) Acting Commissioner of Patents.